(12) United States Patent
Sakuragi

(10) Patent No.: US 8,884,864 B2
(45) Date of Patent: Nov. 11, 2014

(54) IMAGING DEVICE

(75) Inventor: Takamasa Sakuragi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 13/285,435

(22) Filed: Oct. 31, 2011

(65) Prior Publication Data

US 2012/0119787 A1 May 17, 2012

(30) Foreign Application Priority Data

Nov. 17, 2010 (JP) ................................. 2010-257239

(51) Int. Cl.
| G09G 3/36 | (2006.01) |
| H04N 5/378 | (2011.01) |
| H04N 5/365 | (2011.01) |
| H04N 5/374 | (2011.01) |

(52) U.S. Cl.
CPC ............... H04N 5/374 (2013.01); H04N 5/378 (2013.01); H04N 5/3658 (2013.01)
USPC .................. 345/100; 345/98; 345/99

(58) Field of Classification Search
USPC .................................................... 345/98, 100
See application file for complete search history.

(56) References Cited

U.S. PATENT DOCUMENTS

| 7,023,482 | B2 | 4/2006 | Sakuragi |
| 7,397,507 | B2 | 7/2008 | Koseki et al. |
| 7,616,146 | B2 | 11/2009 | Sakakibara ................... 341/164 |
| 7,920,188 | B2 | 4/2011 | Koseki et al. |
| 7,999,875 | B2 | 8/2011 | Toya et al. ..................... 348/360 |
| 8,310,576 | B2 | 11/2012 | Hashimoto et al. |
| 8,416,326 | B2 | 4/2013 | Koseki et al. |
| 8,553,119 | B2 | 10/2013 | Hashimoto et al. |
| 2001/0022572 | A1* | 9/2001 | Murade ........................... 345/98 |
| 2002/0180685 | A1* | 12/2002 | Itakura et al. ................... 345/100 |
| 2009/0190018 | A1 | 7/2009 | Sakakibara ................... 348/308 |
| 2009/0195533 | A1* | 8/2009 | Chen et al. ...................... 345/214 |
| 2009/0218477 | A1 | 9/2009 | Okita et al. |
| 2009/0295969 | A1 | 12/2009 | Kondo ........................... 348/308 |
| 2011/0090173 | A1* | 4/2011 | Huang et al. ................... 345/174 |
| 2011/0102061 | A1* | 5/2011 | Wang et al. ..................... 327/517 |
| 2011/0304756 | A1 | 12/2011 | Sakuragi |

FOREIGN PATENT DOCUMENTS

| CN | 101291388 A | 10/2008 |
| CN | 101320974 A | 12/2008 |
| JP | 06-070222 A | 3/1994 |
| JP | H10-136266 A | 5/1998 |
| JP | 2003-298946 A | 10/2003 |
| JP | 2004-015701 A | 1/2004 |
| JP | 2010-016416 A | 1/2010 |
| WO | WO 2009/141590 A2 | 11/2009 |

* cited by examiner

Primary Examiner — Joe H Cheng
Assistant Examiner — Lisa Landis
(74) Attorney, Agent, or Firm — Fitzpatrick, Cella, Harper & Scinto

(57) ABSTRACT

An imaging device includes a pixel section and an amplification unit which amplifies the signal of the pixel section. The amplification unit includes an input capacitor having first and second nodes, an amplification circuit, a first feedback capacitor connected between the input capacitor and an output portion of the amplification circuit, a first MOS transistor switch connected in series with the first feedback capacitor, a second MOS transistor switch which is connected in series with the first feedback capacitor, and has a drain and a source connected to each other, a second feedback capacitor connected between the input capacitor and the output portion, a third MOS transistor switch connected in series with the second feedback capacitor, and a fourth MOS transistor switch which is connected in series with the second feedback capacitor, and has a drain and a source connected to each other.

7 Claims, 2 Drawing Sheets

IMAGING DEVICE

BACKGROUND OF THE INVENTION

1. Field of the Invention

The present invention relates to an imaging device.

2. Description of the Related Art

It is commonly considered that the S/N ratio and the signal dynamic range are important product indices in solid-state imaging devices. With regard to these indices, Japanese Patent Laid-Open No. 2004-015701 provides an amplification circuit, which controls the gain applied to the pixel signal for each pixel and a detection circuit, which detects the level of a pixel signal to each pixel column of a pixel array formed by arraying pixels in a two-dimensional matrix, thereby improving the above-mentioned indices.

Also, Japanese Patent Laid-Open No. 6-070222 provides an amplification circuit which amplifies a signal output from an image sensing element. So-called "inlaid" composition is performed for a pixel signal from a relatively light region using data obtained by A/D-converting a signal output from the image sensing element, and for a pixel signal from a relatively dark region using data obtained by A/D-converting a signal amplified at a higher gain. Supposedly, this technique effectively uses the dynamic range of the imaging device.

However, in the technique disclosed in Japanese Patent Laid-Open No. 2004-015701, since a detection circuit for detecting a pixel signal from a pixel is provided for each pixel column, the area occupied by the solid-state imaging device increases, and the power consumed when the detection circuit performs detection also increases. Assume that a variable gain amplifier which uses a feedback capacitor and a switch is employed, and a MOS transistor is employed as the switch. In this case, in changing the gain for each pixel, as a charge moves upon the ON/OFF operation of the MOS transistor, the offset voltage accompanying a signal output from the amplification circuit which amplifies a pixel signal fluctuates. When this happens, upon switching the gain of the amplifier, the signal charge stored in the feedback capacitor does not completely move to another feedback capacitor used, thus generating a residual charge. This poses a problem that the gain design value becomes different from the actual gain. However, the technique disclosed in Japanese Patent Laid-Open No. 6-070222 can neither improve the S/N ratio of the signal output from the image sensing element nor widen the dynamic range of the image sensing element.

SUMMARY OF THE INVENTION

The present invention provides a technique advantageous in preventing fluctuations in offset voltage in the output of an amplification unit upon switching the gain of the amplification unit so that the gain design value coincides with an actual gain.

One of the aspects of the present invention provides an imaging device comprising: a pixel section which generates a signal by photoelectric conversion; and an amplification unit which amplifies the signal generated by the pixel section, the amplification unit including an input capacitor having two nodes, wherein one of the two nodes is connected to an output terminal of the pixel section, an amplification circuit having an inverting input portion and a non-inverting input portion, wherein one of the inverting input portion and the non-inverting input portion is connected to the other node of the two nodes of the input capacitor, and the other one of the inverting input portion and the non-inverting input portion is connected to a node of a reference voltage, a first feedback capacitor connected between the other node of the two nodes of the input capacitor and an output portion of the amplification circuit, a first MOS transistor switch connected in series with the first feedback capacitor, a second MOS transistor switch which is connected in series with the first feedback capacitor, and has a drain and a source connected to each other, a second feedback capacitor connected between the other node of the two nodes of the input capacitor and the output portion of the amplification circuit, a third MOS transistor switch connected in series with the second feedback capacitor, and a fourth MOS transistor switch which is connected in series with the second feedback capacitor, and has a drain and a source connected to each other, wherein a series-connected circuit of the first feedback capacitor, the first MOS transistor switch, and the second MOS transistor switch is connected in parallel with a series-connected circuit of the second feedback capacitor, the third MOS transistor switch, and the fourth MOS transistor switch, pulses supplied to gates of the first MOS transistor switch and the second MOS transistor switch have reversed phases, and pulses supplied to gates of the third MOS transistor switch and the fourth MOS transistor switch have reversed phases.

Further features of the present invention will become apparent from the following description of exemplary embodiments with reference to the attached drawings.

DESCRIPTION OF THE EMBODIMENTS

Figure 1:
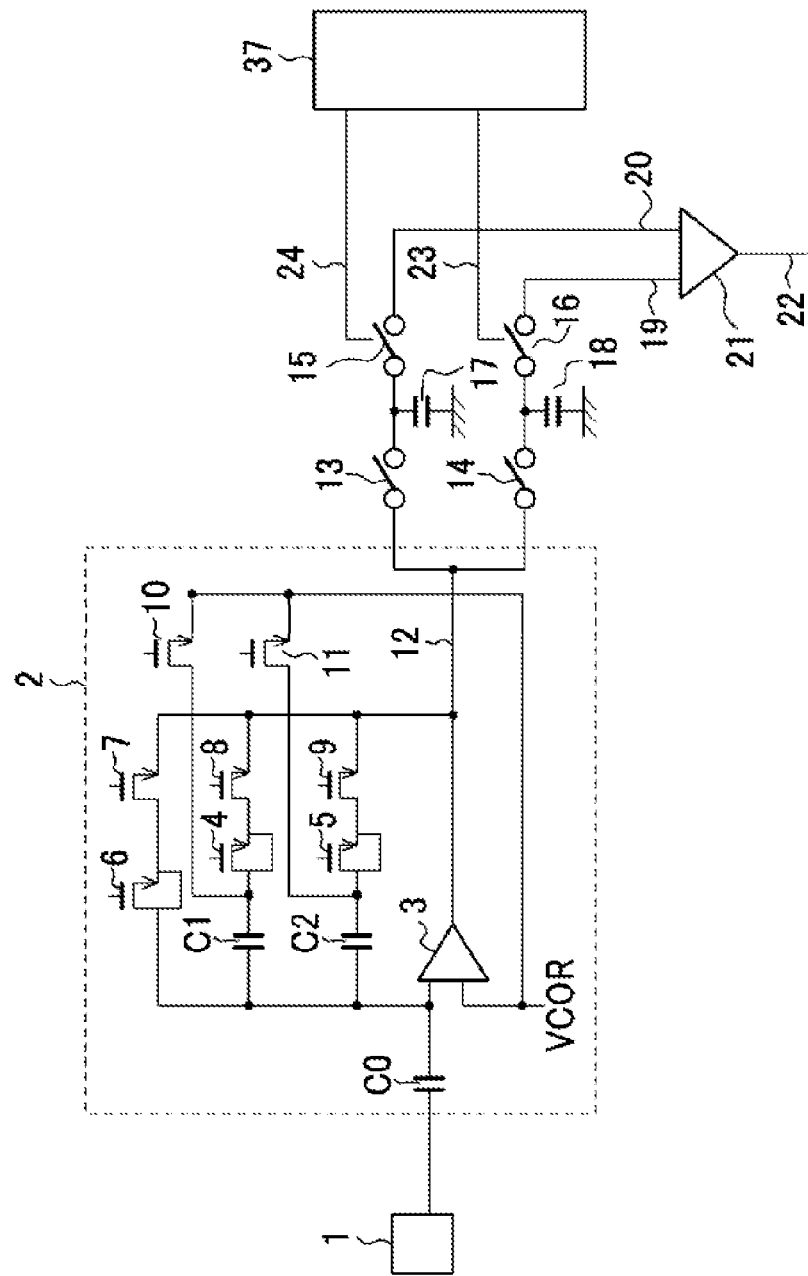
FIG. 1 is a circuit diagram illustrating an example of the configuration of an imaging device according to an embodiment of the present invention.

FIG. 1 is a circuit diagram illustrating an example of the configuration of an imaging device according to an embodiment of the present invention. The imaging device includes a pixel section 1 and amplification unit 2. The pixel section 1 includes a pixel including a photoelectric converter, and generates a signal by photoelectric conversion using the photoelectric converter. The pixel section 1 can include, for example, a plurality of pixels arrayed so as to form pluralities of pixel rows and pixel columns. The amplification unit 2 amplifies a signal generated by the pixel section 1. When, for example, the pixel section 1 includes a plurality of pixel columns, the amplification unit 2 can be provided to each column as a column amplification unit. The amplification unit 2 can include an input capacitor C0, amplification circuit 3, first feedback capacitor C1, second feedback capacitor C2, first MOS transistor switch 8, second MOS transistor switch 4, third MOS transistor switch 9, and fourth MOS transistor switch 5. The amplification unit 2 can also include a fifth MOS transistor switch 7, sixth MOS transistor switch 6, seventh MOS transistor switch 10, and eighth MOS transistor switch 11.

Figure 2:
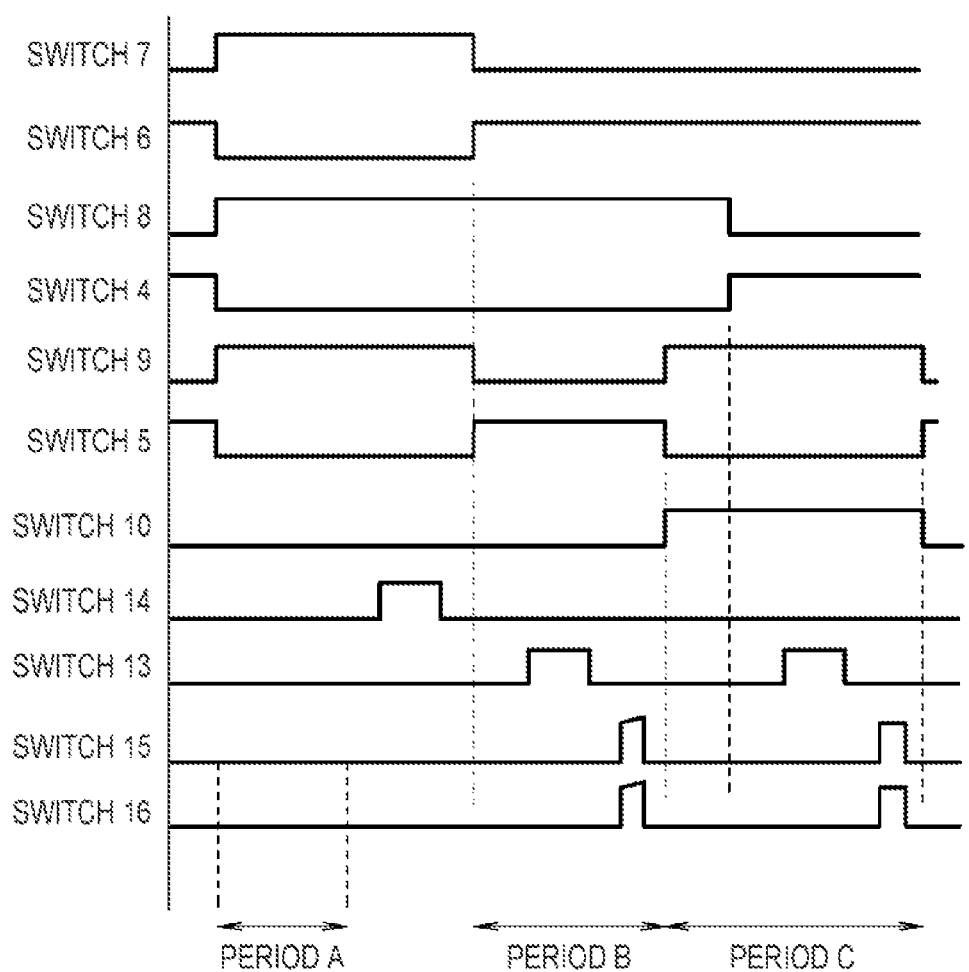
FIG. 2 is an operation timing chart of the imaging device shown in FIG. 1.

The input capacitor C0 has its one node connected to the output terminal of the pixel section 1. One of the inverting input portion and non-inverting input portion of the amplification circuit 3 is connected to the other node of the input capacitor C0, and the other one is connected to the node of a reference voltage VCOR. The first feedback capacitor C1 is connected between the other node of the input capacitor C0 and an output portion 12 of the amplification circuit 3. The first MOS transistor switch 8 is connected in series with the first feedback capacitor C1. The second MOS transistor switch 4 is connected in series with the first feedback capacitor C1, and has its drain and source connected to each other. The second feedback capacitor C2 is connected between the other node of the input capacitor C0 and the output portion 12 of the amplification circuit 3. The third MOS transistor switch 9 is connected in series with the second feedback capacitor C2. The fourth MOS transistor switch 5 is connected in series with the second feedback capacitor C2, and has its drain and source connected to each other. A series-connected circuit of the first feedback capacitor C1, first MOS transistor switch 8, and second MOS transistor switch 4 is connected in parallel with a series-connected circuit of the second feedback capacitor C2, third MOS transistor switch 9, and fourth MOS transistor switch 5. As shown in FIG. 2, pulses supplied to the gates of the first MOS transistor switch 8 and second MOS transistor switch 4 have reversed phases. Pulses supplied to the gates of the third MOS transistor switch 9 and fourth MOS transistor switch 5 have reversed phases.

The fifth MOS transistor switch 7 is connected between the other node of the input capacitor C0 and the output portion 12 of the amplification circuit 3. The sixth MOS transistor switch 6 is connected in series with the fifth MOS transistor switch 7, and has its drain and source connected to each other. A series-connected circuit of the fifth MOS transistor switch 7 and sixth MOS transistor switch 6 is connected in parallel with a series-connected circuit of the second feedback capacitor C2, third MOS transistor switch 9, and fourth MOS transistor switch 5. As shown in FIG. 2, pulses supplied to the gates of the fifth MOS transistor switch 7 and sixth MOS transistor switch 6 have reversed phases. The seventh MOS transistor switch 10 is connected between the first feedback capacitor C1 and the node of the reference voltage VCOR. The eighth MOS transistor switch 11 is connected between the second feedback capacitor C2 and the node of the reference voltage VCOR.

The voltage output from the pixel section 1 is applied to one node of the input capacitor C0 arranged in the amplification unit 2. The inverting input portion of the amplification circuit 3 in the amplification unit 2 is connected to the other node of the input capacitor C0, one node of each of the feedback capacitors C1 and C2, the two nodes of the switch (transistor) 6 for resetting the feedback capacitors C1 and C2 (their charges), and one node of the reset switch 7. The non-inverting input portion of the amplification circuit 3 is connected to the node of the reference voltage VCOR. The switches 4 and 5 serve as offset compensation switches. The switches 4 and 5 serve as dummy switches which compensate for feedthrough charges from the gate electrodes of the switches 8 and 9, respectively, for gain switching, when the switches 8 and 9 are turned off. Each of the switches 4 and 5 has a gate width about half that of the corresponding one of the switches 8 and 9, and its source electrode and drain electrode are connected to each other. A pulse is applied to the gate electrodes of each of the switches 4 and 5 having a phase reversed to that of a pulse applied to the gate electrode of the corresponding one of the switches 8 and 9. In this embodiment, each of the switches 8 and 9 for selecting the feedback capacitors C1 and C2, respectively, has its one node connected to one node of the corresponding one of the switches 10 and 11 serving as gain compensation switches. Thus, a gain error generated in the amplification circuit 3 when the switch 8 or 9 is turned on to select the feedback capacitor C1 or C2, respectively, is corrected. Each of the switches 10 and 11 serving as gain compensation switches has its other node commonly connected to the node of the reference voltage VCOR. Each of the switches 7, 8, and 9 has its other node connected to the output portion 12 of the amplification circuit 3.

A capacitor 17 is connected to the output portion 12 of the amplification circuit 3 via a switch 13. A capacitor 18 is connected to the output portion 12 of the amplification circuit 3 via a switch 14. A differential input portion 20 of a differential amplifier 21 is connected to the capacitor 17 via a switch 15. A differential input portion 19 of the differential amplifier 21 is connected to the capacitor 18 via a switch 16. An output portion 24 of a shift register 37 controls the switch 15. An output portion 23 of the shift register 37 controls the switch 16. The differential amplifier 21 outputs the voltage of the difference between the differential input portions 19 and 20 from an output portion 22. Although all of the switches are assumed to be NMOS transistors in this embodiment, the present invention is not limited to NMOS transistors.

FIG. 2 is an operation timing chart of the imaging device shown in FIG. 1. The operation of the imaging device will be described with reference to FIG. 2. During period A, the pixel section 1 is applied with a reset pulse and reset. During period A, high-level pulses are applied to the gate electrodes of the switches 7, 8, and 9 to turn them on, and low-level pulses are applied to the gate electrodes of the switches 4, 5, and 6 to turn them off. At this time, pulses applied to the gate electrodes of the switches 4, 5, and 6 are set so as to always have phases reversed to those of pulses applied to the gates of the switches 8, 9, and 7, respectively. Thus, the feedback capacitors C1 and C2 are discharged, and an input conversion offset voltage Voff of the amplification circuit 3 appears in the inverting input portion of the amplification circuit 3 because the amplification circuit 3 has a voltage follower configuration. A difference voltage (VCOR+Voff−Vres) between the sum voltage of the reference voltage VCOR and the input conversion offset voltage Voff of the amplification circuit 3, and a reset output voltage Vres of the pixel section 1, is applied to the input capacitor C0. A voltage VCOR+Voff appears in the output portion 12 of the amplification circuit 3, and is stored in the capacitor 18 by turning on the switch 14.

Next, during period B, to select the feedback capacitor C1, low-level pulses are applied to the gate electrodes of the switches 7 and 9 to turn them off, and high-level pulses are applied to the gate electrodes of the switches 5 and 6 to turn them on. After that, the pixel section 1 outputs a signal voltage Vsig corresponding to incident light by photoelectric conversion. Due to a negative feedback effect produced by the amplification circuit 3, the potential at the inverting input portion of the amplification circuit 3 is maintained at VCOR+Voff. Also, the charge held in the input capacitor C0 is stored, so a charge (C0×(Vsig−Vres)) moves to the feedback capacitor C1. A voltage $\{(Vsig-Vres) \times (C0/C1)+VCOR+Voff\}$ corresponding to a difference voltage (Vsig−Vres) between the voltage Vsig and the voltage Vres output in a reset state appears in the output portion 12 of the amplification circuit 3. The switch 13 is turned on to store the voltage $\{(Vsig-Vres) \times (C0/C1)+VCOR+Voff\}$ in the capacitor 17.

When a MOS transistor is used as a switch, it is a common practice to exploit a feature in which an NMOS transistor, for example, is turned off when the voltage across its gate and source is lower than a threshold voltage, and is turned on when this voltage is higher than the threshold voltage. When the NMOS transistor is turned off, its gate electrode is changed from the power supply voltage to 0 V. An overlap capacitance (parasitic capacitance) is present between the gate electrode and the source and drain electrodes. Also, a charge in the channel of the MOS transistor is absorbed in the source and drain upon turning it off. Hence, the charge determined by the product of the amount of change in voltage of the gate and the value of the overlap capacitance, and a part of the channel charge, change as the MOS transistor is turned off. This change is called feedthrough of the MOS transistor. The switches 4, 5, and 6, each of which has a gate width half that of the corresponding one of the MOS transistors 8, 9, and 7, and has its source electrode and drain electrode connected to each other, are connected in series with the switches 8, 9, and 7, respectively, and their gate electrodes are driven in accordance with pulses having reversed phases. Thus, charges with reversed polarities move, thus making it possible to cancel the feedthrough.

When the pulse levels of the output portions 23 and 24 of the shift register 37 change to high level, the switches 16 and 15 are turned on to apply the voltages stored in the capacitors 18 and 17, respectively, to the differential input portions 19 and 20, respectively, of the differential amplifier 21. The differential amplifier 21 subtracts the voltages stored in the capacitors 17 and 18 from each other, and outputs a voltage $\{(Vsig-Vres) \times (C0/C1)\}$ from the output portion 22.

During period C, in order to select the feedback capacitor C2, the switch 9 is turned on, the switch 5 is turned off, and the switch 8 is turned off. Although period C includes a transition period in which the switches 8, 9, and 10 are all ON, no operational problem is posed even if this transition period is not provided. Also, the switch 10 is turned on simultaneously with the switch 9 in order to apply the reference voltage VCOR to one node voltage of the feedback capacitor C1, thereby changing the voltage across the nodes of the feedback capacitor C1 from $\{(Vsig-Vres) \times (C0/C1)\}$ to Voff. With this operation, the charge stored in the feedback capacitor C1 changes from $\{(Vsig-Vres) \times C0\}$ to $Voff \times C1$, and a charge $\{(Vsig-Vres) \times C0 - Voff \times C1\}$ that is the difference between the former and latter charges moves to the feedback capacitor C2. Therefore, the voltage across the nodes of the feedback capacitor C2 changes to $\{(Vsig-Vres) \times C0/C2 - Voff \times C1/C2\}$, and the voltage output from the output portion 12 changes to $\{(Vsig-Vres) \times C0/C2 + Voff \times (1-C1/C2) + VCOR\}$. After that, as mentioned above, the switch 8 is turned off, and the switch 4 is turned on. At this time, if the offset compensation switches 4 and 5 are absent, the gate channel charge of the switches 8 and 9 moves based upon their ON/OFF operations, and is stored in the feedback capacitor C2. Thus, this charge generates an offset in the voltage output from the output portion 12. When the state of the switch 8 changes from an ON state to an OFF state, the channel charge of the switch 8 is absorbed in that of the switch 4 upon changing the state of the switch 4 from an OFF state to an ON state, so this charge neither moves to the feedback capacitor C2 nor is stored.

The appropriate gate width of the MOS transistor of each of the switches 4, 5, and 6 is basically half that of the MOS transistor of the corresponding one of the switches 7, 8, and 9. However, in practice, a gate width larger than ½ is often optimum because of imbalance among the voltages across the nodes of the respective switches.

After the switch 8 is turned off, the switch 13 is turned on again, the voltage of the output portion 12 is stored in the capacitor 17, and the pulse levels of the output portions 23 and 24 of the shift register 37 are changed to high level, thereby turning on the switches 16 and 15, respectively. Thus, a difference voltage $\{(Vsig-Vres) \times C0/C2 - Voff \times C1/C2\}$ between the capacitors 17 and 18 is output from the output portion 22 of the differential amplifier 21. When the input conversion offset voltage Voff is sufficiently low, this output voltage is approximated by $\{(Vsig-Vres) \times C0/C2\}$, which is equal to the original gain design value.

The imaging device according to this embodiment is provided with the amplification unit 2, thereby making it possible to widen the signal dynamic range and improve the S/N ratio. With the above-mentioned operation sequence, while the pixel section 1 outputs a signal corresponding to incident light, the gain of the amplification circuit 3 can be changed with suppression of its gain error and offset error. The offset compensation switches 4 and 5 are connected in series with the MOS transistor switches 8 and 9, respectively, which switch the plurality of feedback capacitors C1 and C2, respectively, that determine the gain of the amplification circuit 3. Thus, in an imaging device in which the gain of the amplification unit 2 can be changed while a signal is output from the pixel section 1, it is possible to correct an offset voltage generated in the amplification circuit 3 when the transistor 8 or 9 is turned on to select the respective feedback capacitor C1 or C2 so as to change the gain. This makes it possible to prevent a fluctuation in offset voltage in the output of the amplification unit 2 upon switching the gain of the variable gain amplification unit 2 provided for each column, and to provide an amplification unit 2 in which the design value of each gain coincides with the actual gain.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-257239, filed Nov. 17, 2010, which is hereby incorporated by reference herein in its entirety.

What is claimed is:

1. An imaging device comprising:
a pixel section which generates a signal by photoelectric conversion; and
an amplification unit which amplifies the signal generated by the pixel section, the amplification unit including:
an input capacitor having a first node and a second node, wherein the first node of the input capacitor is connected to an output terminal of the pixel section,
an amplification circuit having an inverting input portion and a non-inverting input portion, wherein one of the inverting input portion and the non-inverting input portion is connected to the second node of the input capacitor, and the other one of the inverting input portion and the non-inverting input portion is connected to a node of a reference voltage,
a first series-connected circuit connected between the second node of the input capacitor and an output portion of the amplification circuit, the first series-connected circuit including a first feedback capacitor, a first MOS transistor switch connected in series with the first feedback capacitor, and a second MOS transistor switch which is connected in series with the first feedback capacitor, and which has a drain and a source connected to each other, and
a second series-connected circuit connected between the second node of the input capacitor and the output portion of the amplification circuit, the second series-connected circuit including a second feedback capacitor, a third MOS transistor switch connected in series with the second feedback capacitor, and a fourth MOS transistor switch which is connected in series with the second feedback capacitor, and which has a drain and a source connected to each other,
wherein the first series-connected circuit is connected in parallel with the second series-connected circuit, wherein pulses supplied to gates of the first MOS transistor switch and the second MOS transistor switch have reversed phases, wherein pulses supplied to gates of the third MOS transistor switch and the fourth MOS transistor switch have reversed phases, and wherein a gain of the amplification unit is changed from a first gain to a second gain, during a period when one signal is output from the pixel section, the first gain being provided when the first series-connected circuit including the first feedback capacitor, the first MOS transistor switch, and the second MOS transistor switch is activated by turning on the first MOS transistor switch, the second gain being provided when the second series-connected circuit including the second feedback capacitor, the third MOS transistor switch, and the fourth MOS transistor switch is activated by turning on the third MOS transistor switch.

2. The device according to claim 1, wherein the pixel section includes a plurality of pixels which form rows and columns, wherein each of the plurality of pixels generates a signal by photoelectric conversion, and wherein the device further comprises a plurality of the amplification unit each of which is provided to a corresponding column of the pixel section.

3. The device according to claim 1, wherein the second MOS transistor switch has a gate width not less than ½ of a gate width of the first MOS transistor switch.

4. The device according to claim 1, wherein the fourth MOS transistor switch has a gate width not less than ½ of a gate width of the third MOS transistor switch.

5. An imaging device comprising:

a pixel section which generates a signal by photoelectric conversion; and an amplification unit which amplifies the signal generated by the pixel section, the amplification unit including:

an input capacitor having a first node and a second node, wherein the first node of the input capacitor is connected to an output terminal of the pixel section, an amplification circuit having an inverting input portion and a non-inverting input portion, wherein one of the inverting input portion and the non-inverting input portion is connected to the second node of the input capacitor, and the other one of the inverting input portion and the non-inverting input portion is connected to a node of a reference voltage, a first series-connected circuit connected between the second node of the input capacitor and an output portion of the amplification circuit, the first series-connected circuit including a first feedback capacitor, a first MOS transistor switch connected in series with the first feedback capacitor, and a second MOS transistor switch which is connected in series with the first feedback capacitor, and which has a drain and a source connected to each other, a second series-connected circuit connected between the second node of the input capacitor and the output portion of the amplification circuit, the second series-connected circuit including a second feedback capacitor, a third MOS transistor switch connected in series with the second feedback capacitor, and a fourth MOS transistor switch which is connected in series with the second feedback capacitor, and which has a drain and a source connected to each other, and a third series-connected circuit connected between the second node of the input capacitor and the output portion of the amplification circuit, the third series-connected circuit including a fifth MOS transistor switch, and a sixth MOS transistor switch which is connected in series with the fifth MOS transistor switch, and which has a drain and a source connected to each other, wherein the first series-connected circuit, the second series-connected circuit and the third series-connected circuit are connected in parallel with each other, wherein pulses supplied to gates of the first MOS transistor switch and the second MOS transistor switch have reversed phases, wherein pulses supplied to gates of the third MOS transistor switch and the fourth MOS transistor switch have reversed phases, and wherein pulses supplied to gates of the fifth MOS transistor switch and the sixth MOS transistor switch have reversed phases.

6. The device according to claim 5, wherein the sixth MOS transistor switch has a gate width not less than ½ of a gate width of the fifth MOS transistor switch.

7. An imaging device comprising:

a pixel section which generates a signal by photoelectric conversion; and an amplification unit which amplifies the signal generated by the pixel section, the amplification unit including:

an input capacitor having a first node and a second node, wherein the first node of the input capacitor is connected to an output terminal of the pixel section, an amplification circuit having an inverting input portion and a non-inverting input portion, wherein one of the inverting input portion and the non-inverting input portion is connected to the second node of the input capacitor, and the other one of the inverting input portion and the non-inverting input portion is connected to a node of a reference voltage, a first series-connected circuit connected between the second node of the input capacitor and an output portion of the amplification circuit, the first series-connected circuit including a first feedback capacitor, a first MOS transistor switch connected in series with the first feedback capacitor, and a second MOS transistor switch which is connected in series with the first feedback capacitor, and which has a drain and a source connected to each other, a second series-connected circuit connected between the second node of the input capacitor and the output portion of the amplification circuit, the second series-connected circuit including a second feedback capacitor, a third MOS transistor switch connected in series with the second feedback capacitor, and a fourth MOS transistor switch which is connected in series with the second feedback capacitor, and which has a drain and a source connected to each other, a fifth MOS transistor switch connected between the first feedback capacitor and the node of the reference voltage, and a sixth MOS transistor switch connected between the second feedback capacitor and the node of the reference voltage, wherein the first series-connected circuit is connected in parallel with the second series-connected circuit, wherein pulses supplied to gates of the first MOS transistor switch and the second MOS transistor switch have reversed phases, and wherein pulses supplied to gates of the third MOS transistor switch and the fourth MOS transistor switch have reversed phases.

\* \* \* \* \*